Patented Sept. 24, 1935

2,015,105

UNITED STATES PATENT OFFICE 2,015,105

HYDRATION OF OLEFINES

Henry Dreyfus, London, England

No Drawing. Application October 17, 1932, Serial No. 638,180. In Great Britain November 2, 1931

12 Claims. (Cl. 260—156)

This invention relates to the manufacture of hydration products of olefines, and especially to the manufacture of ethyl alcohol and/or diethyl ether from ethylene.

I have found that hydration products of olefines may be produced by subjecting olefines to the successive and/or simultaneous action of an acid in presence of an ester and of water or water vapour. As the acid I prefer to use a strong mineral acid of low volatility, such as sulphuric acid or phosphoric acid or an organic acid derived from such mineral acid, such as a sulphonic acid. Sulphuric or phosphoric esters such as the esters of these acids with glycols, polyhydric alcohols, higher fatty acids or derivatives thereof are especially useful for the purpose of the invention, although other esters may be employed, if desired, other than the esters formed by reaction between the olefines and acid employed, such as ethyl sulphuric acid when ethylene is absorbed in sulphuric acid.

As specific instances of esters that may be employed according to the invention may be mentioned the mono sulphuric ester of glycol, sulphuric acid esters of glycerol, hydroxy stearosulphuric acid, sulphoricinoleic acid, sulpho-aromatic stearic acids (Twitchell reagents), phosphoric esters of glycol and glycerol, etc. Preferably esters of the particular acid employed are used. Thus, when sulphuric acid is employed I prefer to use esters of sulphuric acid such as those mentioned above. When the esters contain free acid groups, for instance one or more free $SO_3H$ groups, they may be employed without the addition of any other acid, the same compound thus serving both as acid and ester.

The manufacture of hydration products of olefines according to the invention may be carried out in any convenient way. Thus an olefine may be absorbed in more or less concentrated acid solutions containing one or more esters, and the ester formed from the olefine and the acid may be subsequently hydrolyzed to give an alcohol or ether and to regenerate the acid, which may again be employed in the absorption. Alternatively the olefine may be caused to react continuously with water or water vapour and with the ester-containing acid liquor, while the hydration products may be continuously removed from the reaction zone in any convenient way, for example by distillation.

As an example of a two stage process embodying the invention the hydration of ethylene employing sulphuric acid and one or more of the sulphuric esters mentioned above may be described. Although a concentrated sulphuric acid may be employed if desired, it is preferable to use an acid diluted with water, for example, aqueous sulphuric acid containing from about 60% to 90% of sulphuric acid.

The esters may be present in the sulphuric acid in any convenient amount. Since, as stated above, esters containing free sulphonic groups ($SO_3H$) may be employed in absence of any further acid, such esters may be present in concentrations up to 100%, but it will usually be preferable, on economic grounds, to employ considerably lower concentrations. In general, concentrations between 2% and 40%, and especially between 5% and 20% may advantageously be employed, but higher or lower concentrations may be used if desired.

The absorption may be conducted at an elevated temperature, for example between about 60° and 80° C. although the invention is not limited to the use of such temperatures. When homologues of ethylene are to be treated, lower temperatures may advantageously be employed; for example the hydration of propylene may be effected at temperatures between about 35° and 60° C., while, especially when butylene and higher olefines are being treated, the absorption may often be carried out at ordinary atmospheric temperatures. The temperature to be employed in any particular case will depend also on the activity of the absorbing liquor. Thus when acids of higher concentration are employed lower temperatures will be required than when comparatively dilute acids are used.

When mixtures of olefines are to be treated such mixtures may, if desired, be subjected to the action of a series of absorbing liquors of increasing acidity and/or at increasing temperatures, thus effecting a preferential absorption of the higher olefines in the liquors of lower acidity and/or at a lower temperature, followed by absorption of the lower olefines in the liquors of higher acidity and/or at higher temperatures.

The absorption may be effected under atmospheric pressure, or pressures exceeding atmospheric, for example pressures up to about five atmospheres.

The absorbing liquors may if desired contain, besides the esters, salts or other substances capable of promoting the absorption of ethylene or other olefines. As instances of such substances may be mentioned calcium sulphate, lead sulphate, silver sulphate, iron sulphate, ferrous ammonium sulphate, mercurous sulphate, silver and copper. Such substances may be employed in comparatively small amounts, for instance between about, about ½ and 4% of the absorbing liquor, but other proportions may be used if desired.

Subsequent to the absorption of the ethylene the product may be subjected to hydrolysis in any convenient way. For example, the liquors may be diluted with water and boiled or heated to expel the alcohol, or they may be treated with a smaller quantity of water to yield diethyl ether.

When the hydration is effected in a single stage or continuous process, solutions similar to those described above may be employed; usually however it will be found advisable to employ somewhat higher temperatures than in the two stage or discontinuous process. Thus, for example, temperatures between about 100° and 350° C., and especially between 150° and 250° C, are in general very suitable. Higher pressures, for example pressures up to 25 atmospheres or more, may also frequently be employed with advantage.

The reaction may be effected in any convenient way. For example a mixture of ethylene and steam may be passed through an ester-containing acid solution such as those described above, which may be heated to the desired temperature, and maintained under the desired pressure. In such a case the mixture of ethylene and water vapour is preferably led into the acid liquor in a very finely divided form, and the efficiency of the process may be further increased by stirring or otherwise thoroughly agitating the liquor. Advantageously the reaction conditions are chosen so that the alcohol and/or ether produced may be continuously removed from the reaction zone in vapour form.

In another method of carrying out this process the ethylene and water vapour may be caused to flow in countercurrent to the ester-containing acid liquors. For instance, the liquors may be allowed to trickle down a tower up which are passed the reactant gases or vapours, and the products of reaction may be removed in vapour form from the top of the tower. Any other method of bringing the ethylene into contact with the ester-containing acid solution and with water may be employed.

The mixtures of ethylene and water vapour may contain these substances in any convenient proportions, according to the products to be obtained. Thus, if considerable proportions of diethyl ether are to be obtained the ethylene may be employed in at least twice the amount of the water vapour, while if ethyl alcohol is to be the main product approximately equimolecular proportions may be used, although intermediate proportions may also be employed with good results. Preferably excess of water vapour is avoided, in order both to avoid substantial dilution of the acid liquors and to ensure that the hydration products are obtained in a concentrated or comparatively concentrated state.

If desired the mixtures of ethylene and water vapour may be preheated, for instance to temperatures up to about 150° C., in any convenient way, before coming into contact with the acid liquors.

In a modification of this method of applying the invention, the ethylene, either alone or in admixture with comparatively small quantities of water, may be led into a dilute acid liquor, for example into 50–60% sulphuric acid, in which case the hydration may be effected by the liquid water in the acid solution. In such cases the concentration of the ester-containing acid liquor is preferably maintained at a constant value, for example, by the continuous or occasional addition of liquid water.

As in the two stage process, the acid liquors may comprise, besides the esters, substances capable of promoting the absorption of ethylene.

If desired a combination of the two stage and one stage process may be employed. For example, the ethylene or other olefine mixture may first be passed through an absorbing solution, the gases or vapours remaining being subsequently subjected to the action of an ester-containing acid liquor at a higher temperature as described above. Conveniently, from a mixture of olefines the higher olefines may be removed by absorption, and the gases remaining may be treated according to any form of the one stage process as described above.

Although the invention has been described more particularly with reference to the hydration of ethylene, it may be applied to other olefines, such as propylene, butylene, or higher olefines, or to mixtures of olefines. The olefines may, of course, be employed in the form of mixtures with inert gases such as nitrogen, etc.

The following examples are intended to illustrate the invention, which is in nowise limited thereby.

*Example 1*

Ethylene is passed through a 90% sulphuric acid solution, containing 5% of its weight of mono sulphuric ester of glycol, and 10% sulphoricinoleic acid; the acid liquor is maintained at a temperature of about 70° C., and the absorption conducted under a pressure of two atmospheres. When absorption is practically complete, the acid liquor is diluted with about three times its weight of water, and boiled. The ethyl alcohol formed may be removed in any convenient way, for example by fractionation.

*Example 2*

A gas mixture comprising olefines obtained from an oil cracking plant is first treated in any convenient way to remove sulphur compounds, and is then led up a tower, down which flows a 50% sulphuric acid containing about 5% hydroxystearosulphuric acid and an equal quantity of sulpho-aromatic stearic acids, maintained at about 20° C. By this means the higher olefines are removed from the mixture, and may be recovered as the corresponding alcohols by hydrolyzing their sulphuric esters. The gases remaining, which consist mainly of ethylene and propylene, with inert gases and saturated hydrocarbons, are passed through a tower in counter-current to 70% sulphuric acid containing about 15% of the sulpho-aromatic stearic acids and about 5% hydroxy-stearosulphuric acid, the tower being maintained at a temperature of about 180° C. by means of a jacket through which hot gases, such as combustion gases, may be passed. The vapours issuing from the top of the tower are condensed to remove the alcohols or other hydration products, and the gases remaining, so long as they contain substantial quantities of olefines, are returned to the process. The gas finally obtained, containing only small quantities of unsaturated hydrocarbons, may conveniently be burnt, and employed to heat the acid liquors in the second stage of the process.

What I claim and desire to secure by Letters Patent is:—

1. Process for the manufacture of hydration products of olefines, which comprises bringing an olefine into contact simultaneously with an acid selected from the group which consists of mineral acids of low volatility and acid organic derivatives thereof, and with an ester of a mineral acid of low volatility with an alcohol containing a plurality of hydroxyl groups.

2. Process for the manufacture of hydration products of olefines, which comprises bringing an olefine into contact with aqueous sulphuric acid in presence of a sulphuric ester of an alcohol containing a plurality of hydroxy groups.

3. Process for the manufacture of hydration products of olefines, which comprises bringing an olefine into contact simultaneously with phosphoric acid and with an ester of phosphoric acid with an alcohol containing a plurality of hydroxyl groups.

4. Process for the manufacture of hydration products of olefines, which comprises bringing an olefine into contact simultaneously with sulphuric acid and with an ester of sulphuric acid with a glycol.

5. Process for the manufacture of hydration products of olefines, which comprises bringing an olefine into contact simultaneously with sulphuric acid and with an ester of sulphuric acid with glycerol.

6. Process for the manufacture of hydration products of olefines, which comprises bringing an olefine into contact with aqueous sulphuric acid of concentration between 60% and 90% in the presence of a sulphuric ester of an alcohol containing a plurality of hydroxy groups.

7. Process for the manufacture of hydration products of olefines, which comprises bringing an olefine into contact with aqueous sulphuric acid of concentration between 60% and 90% in presence of between 5% and 20% of a sulphuric ester of an alcohol containing a plurality of hydroxy groups.

8. Process for the manufacture of hydration products of olefines, which comprises bringing an olefine into contact simultaneously with an acid selected from the group which consists of mineral acids of low volatility and acid organic derivatives thereof, and with an ester of a mineral acid of low volatility with an alcohol containing a plurality of hydroxyl groups, diluting the product with water and heating it to set free the hydration products.

9. Process for the manufacture of hydration products of ethylene which comprises bringing ethylene into contact with aqueous sulphuric acid of concentration between 60% and 90% containing between 5% and 20% of a sulphuric ester of an alcohol containing a plurality of hydroxy groups, diluting the product with water and heating to set free the hydration products.

10. Process for the manufacture of hydration products of olefines, which comprises bringing an olefine into contact simultaneously with an acid selected from the group which consists of mineral acids of low volatility and acid organic derivatives thereof and with an ester of a mineral acid of low volatility with an alcohol containing a plurality of hydroxyl groups, maintaining the acid liquor at a temperature between 100° and 350° C. and under super-atmospheric pressure and removing the hydration products by distillation.

11. Process for the manufacture of hydration products of ethylene, which comprises bringing ethylene into contact with aqueous sulphuric acid of concentration between 60% and 90% containing between 5% and 20% sulphuric ester of an alcohol containing a plurality of hydroxy groups, maintaining the acid liquor at a temperature between 150° and 250° C. under a pressure between 1 and 25 atmospheres and removing the hydration products by distillation.

12. Process for the manufacture of hydration products of olefines, which comprises passing a mixture of olefines in contact simultaneously with an acid selected from the group which consists of mineral acids of low volatility and acid organic derivatives thereof, and with an ester of a mineral acid of low volatility with an alcohol containing a plurality of hydroxyl groups, the mixture of acid and ester being adapted to absorb only higher olefines, subjecting the product to hydrolysis, and passing the unabsorbed gases and vapours in contact simultaneously with a more concentrated acid and an ester selected from the same respective groups, at a temperature between 150° and 250° C. and under a pressure between 1 and 25 atmospheres and removing the hydration products by distillation.

HENRY DREYFUS.